Dec. 30, 1958   J. A. POTCHEN ET AL   2,866,730
LAMINATED PANEL AND PROCESS FOR PRODUCING SAME
Filed May 11, 1955
2 Sheets-Sheet 1
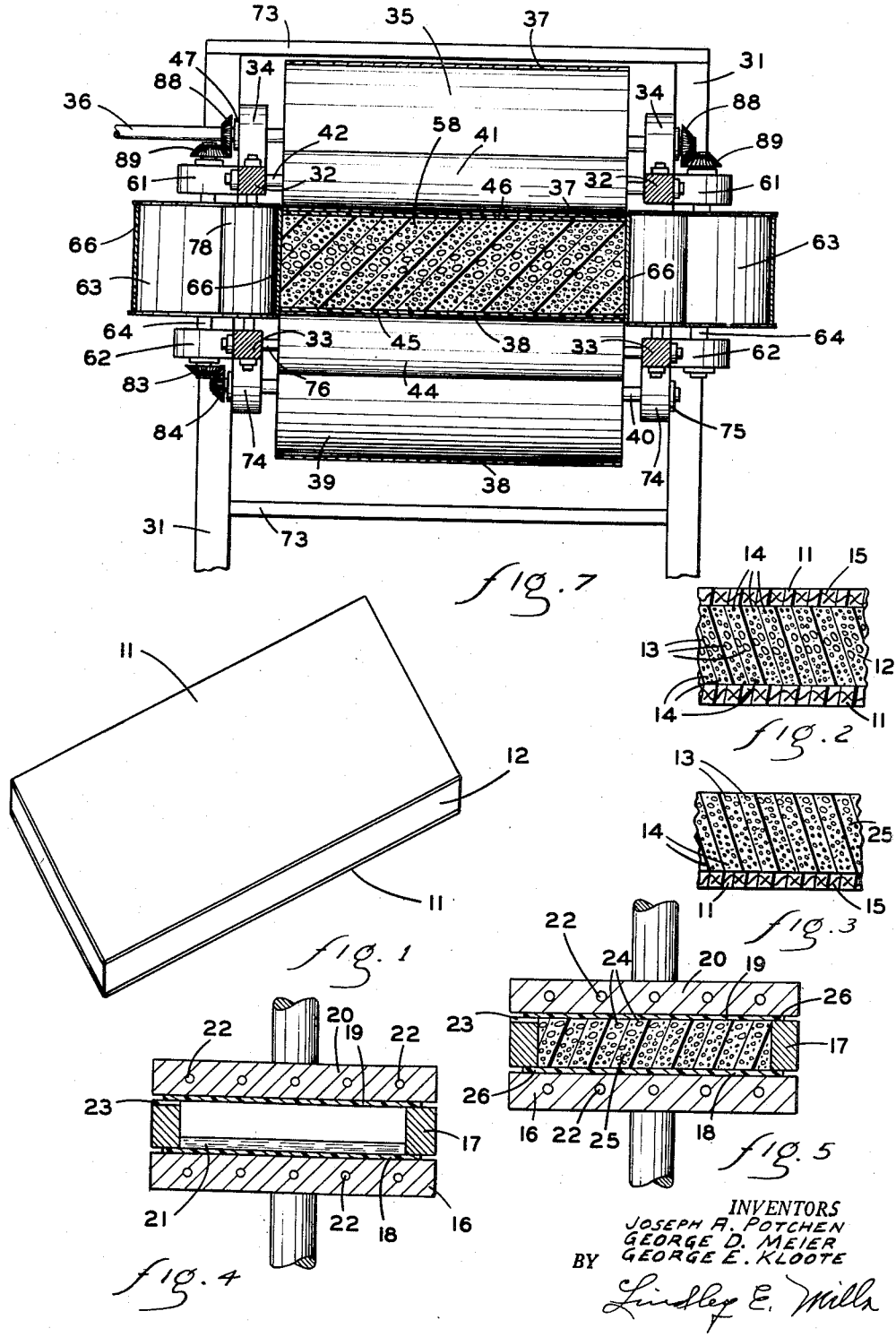
INVENTORS
JOSEPH A. POTCHEN
GEORGE D. MEIER
GEORGE E. KLOOTE
BY
Lindley E. Mills Dec. 30, 1958 J. A. POTCHEN ET AL 2,866,730
LAMINATED PANEL AND PROCESS FOR PRODUCING SAME
Filed May 11, 1955 2 Sheets-Sheet 2

INVENTORS
JOSEPH A. POTCHEN
GEORGE D. MEIER
GEORGE E. KLOOTE
BY Lindley E. Mills

2,866,730

LAMINATED PANEL AND PROCESS FOR PRODUCING SAME

Joseph A. Potchen, Marne, and George E. Kloote and George D. Meier, Grand Rapids, Mich., assignors, by mesne assignments, to Haskelite Manufacturing Corporation, a corporation of Delaware Application May 11, 1955, Serial No. 507,566

8 Claims. (Cl. 154—100)

This invention relates to a laminated article, particularly to a laminated panel characterized by its high strength and high degree of rigidity and dimensional stability, by its resistance to deflection under lateral load coupled with its light weight, by its stability or lack of deterioration under adverse conditions, by its effective insulating properties and by the absence of a separate adhesive substance bonding the laminae together. This application is a continuation-in-part of application Serial No. 479,498, filed January 13, 1955, now abandoned.

The art of making lightweight stable panels of various types and constructions useful for structural, insulating or decorative purposes has become of great importance. Panels made according to so-called "honeycomb" designs have long been utilized widely for such purposes. More recently, lightweight panels have been devised which comprise a core of a foamed resinous substance, such as foamed polystyrene, foamed cellulose acetate and the like. Such foamed resinous substances can often be made with a substantially uniform apparent density as low as about 2 pounds per cubic foot without serious decrease in the structural strength of the foam, based upon the actual weight of the resinous substance present per unit volume. Panels and other articles having such lightweight cores are generally faced with relatively thin sheets of high strength material both to increase the total strength of the laminated article, especially as regards bending under lateral load, and, also, to provide a smooth surface for the article which is less pervious and of greater decorative and otherwise useful value than is the surface of the foamed resin itself.

Although lightweight faced panels as prepared heretofore are of considerable value for many purposes, their inherent nature leaves much to be desired insofar as their utilization in certain types of applications is concerned. This is especially true insofar as their ability to resist lateral loads without failure or breaking is concerned. Such panels have generally been prepared utilizing a preformed core of substantially uniform density of a suitable foamed resin.

One method which has been attempted for applying the facing sheet comprises coating the core with a layer of a suitable hardenable or polymerizable liquid resin mixture and then polymerizing the liquid resin in situ to form the facing sheet directly on the core. Little success has been attained using this method. One reason for this lack of success has been the tendency for components of the liquid resin mixture to dissolve or soften the resin forming the foamed core. As a result of such solvent action, the dimensions of the core are altered drastically and the bond between the core and the facing sheet is weak and often discontinuous over large areas. The fact that some of the most desirable core materials actually soften or melt at a temperature well below that preferably employed for curing or polymerizing some of the resins or mixture most desirable for forming the facing sheet limits drastically the combinations of resinous substances which can be used employing such methods. The difficulty of reinforcing a facing sheet, e. g. with glass fibers, when the sheet is formed under such conditions is very great. As a result of these difficulties, the facing sheet is usually non-uniform in thickness and of non-uniform strength, both of which are highly undesirable.

In another method for applying the facing sheet, described and claimed in co-pending application Serial No. 495,914, filed March 22, 1955, which is also a continuation-in-part of the parent application Serial No. 479,498, filed January 13, 1955, now abandoned, a performed facing sheet is also utilized and the facing sheet is then adhered directly to the lightweight core with a suitable adhesive. This latter method gives excellent results when the core, the facing sheet and the adhesive are chosen properly with respect to one another. The facing sheet can be reinforced satisfactorily and a suitable bond can be obtained. Even here, however, the process involves prefabrication of the core, usually from smaller blocks, to accurate dimensions and the applying and setting of an adhesive. The undesirable character of such operations is well known.

It is known that in the bending of a panel or beam under a laterally applied load the greatest tensile force is exerted in the outer layers of material on the convex side of the bend and that this force persists in decreasing values in the layers underlying the convex surface until a layer intermediate the surfaces is reached. At this layer, which is the central layer in a beam or panel of uniform thickness and composition, there is essentially no tensile force exerted. As the concave side of the panel or beam is approached from the intermediate layer, the force becomes compressive rather than tensile and increases until the concave surface is reached where the compressive force is greatest.

It is thus seen that in a lightweight panel faced on both sides the lightweight core is, especially when the facing sheets are thin, subjected to considerable stress, the nature of which varies with the particular region of the core considered. The portion of the core adjacent the facing sheet on the convex side of the panel may be subject both to a longitudinal stress and to a compressive stress directed along the radius of bending toward the center of bending. Although foamed resinous cores having a density as low as about 2 pounds per cubic foot can be prepared without significant decrease in the tensile strength of the resin, based on the amount of resin present per unit volume, the actual tensile strength of the foam is low when the density is desirably low. It is thus necessary, when the core is desirably low in density, to rely almost entirely on the facing sheet to resist tensile stress due to bending. For this reason the facing sheet must be heavier than would be necessary if a considerable portion of the stress could be borne by the regions of the core adjacent the facing sheet. The compressive force inward along the radius of bending on the same part of the core is often considerable, but generally not great enough to cause initial failure of the panel in this region by crushing of the core.

The forces exerted on the lightweight core on the concave side of the panel adjacent the facing sheet are of an entirely different character. Because the facing sheet is usually thin and will resist compression without buckling principally because of its being bonded to the lightweight core, a great deal of the compressive force exerted on this side of the panel, both in a direction transverse to the radius of bending and in the direction of the radius of bending away from the center of bending is borne by the lightweight core itself, especially by the layers of the core nearest the concave facing sheet. For these reasons it is common for such lightweight panels to fail under lateral overload along and immediately below the concave core surface resulting from the bending, the failure generally occurring under a load much less than that which would cause failure of the panel because of the tensile stress on the convex side of the bend. Other tensile, compressive and shearing stresses are also set up when such panels are subjected to pure bending, concentrated loading or denting impact, the nature and magnitude of which vary from region to region with the conditions imposed.

The net result is that for any particular panel having identical thin facing sheets adhered on each side of a lightweight core of uniform composition and density the regions subjected to the greatest stresses are highly unbalanced insofar as their ultimate strengths at failure under the particular stresses imposed on them when the panel resists a lateral load are concerned. It is apparent that only by balancing the ultimate strengths at failure of the different regions of the panel in accordance with the magnitude and nature of the respective forces exerted on them can a panel be prepared in which the full utility of all of the material entering into its composition can be realized. Anything short of this will result in a panel which is heavier and more costly than it need be for the resistance to bending under lateral load which it actually offers.

Little difficulty is experienced in preparing thin facing sheets for panels and other structures having a lightweight core which have more than adequate tensile strength as compared with the compressive strength of conventional lightweight resinous foams of uniform density available for use as core materials. Thin polyester facing sheets reinforced with unoriented glass filaments or with glass fabrics, such as those mentioned previously, have very high tensile strengths and, when secured to a suitable lightweight core, are very satisfactory insofar as thinness, weight and tensile strength are concerned. However, as also mentioned previously, such facing sheets, when desirably thin, buckle easily under compression and the compressive forces in precisely those regions where they are greatest must be borne to a great extent by the lightweight core material which is relatively easily damaged by compression.

It is thus apparent that many of the undesirable characteristics of lightweight faced panels, and of other similar structures which must be subjected to lateral stresses, can be overcome utilizing heretofore known procedures only by increasing the uniform density and strength of the lightweight core or by increasing the thickness and resistance to buckling under compression of the facing sheet, or both. It is equally apparent that either of these measures will add undesirably to the total weight of the panel per unit area and will accomplish little or nothing in the way of balancing the resistance of the panel to tensile and compressive stresses in the regions where these respective stresses are greatest in such a way as to utilize more fully the total weight of material making up the panel.

The present invention is concerned with a faced panel or other lightweight faced structure which overcomes many of the difficulties referred to above which are inherent in such structures as prepared by heretofore known procedures. The invention is based, in part, on the discovery that a structure or panel having a lightweight core and a suitable facing sheet can be prepared, according to procedures which will be described, by foaming the core in situ in contact with the facing sheet in such a way that the core varies in density and strength from a desirably high value in a region immediately adjacent the facing sheet to desirably lower value in regions removed from the facing sheet. When so constructed, the core is of greater density and offers increased resistance to injury or crushing by compression in precisely those regions where the compressive forces exerted on the core are the greatest when the article is subjected to lateral stress. At the same time, the density of the core is maintained at desirably low values in regions removed from the facing sheet which are subjected to compressive stresses less than those to which the region adjacent the facing sheet is subjected, which effects a great saving in weight and cost of core material over that necessary to produce a panel of similar strength utilizing the same facing sheets but with a core of uniform density throughout. Under such conditions the thickness and weight of the facing sheets need not be increased to obtain a greatly increased resistance of the panel to failure under lateral load. It is even frequently possible to use thinner facing sheets because of the greater tensile and compressive strengths of the denser regions of the core adjacent the facing sheets.

The preferred modification of the article of the invention comprises a panel which is faced on each side and in which the density of the foamed core is greatest in regions adjacent each facing sheet and decreases to a region of lowest density in a region intermediate the facing sheets, usually approximately halfway between them. However, the density, even in the regions of least density, should be adequate to prevent low shear failure or excessive shear deformation in the region. Such a panel can be prepared by first coating one side of each of a pair of facing sheets with a suitable quantity of a viscous foamable and hardenable resin or resin mixture and then causing the mixture to foam to an extent short of that to which it is capable of foaming. Under such conditions the partially foamed resinous mixture on the facing sheets consists of the partially hardened liquid containing a plurality of voids or bubbles filled with gas, the liberation of which form the resinous mixture leads to the formation of the foam. Because of the tendency of the bubbles to rise in the viscous liquid layer, the layer becomes somewhat stratified, being of least density in the region farthest removed from the facing sheet and of greatest density in the regions adjacent the facing sheet. In certain instances the regions adjacent the facing sheet may consist almost entirely of the somewhat thickened liquid resin free of more than a relatively small number of small bubbles while the regions removed from the facing sheet may consist almost entirely of the larger bubbles which have been formed separated by relatively thin walls of more nearly hardened resin. This desirable condition can be accentuated by allowing radiant heat to impinge on the surface of the viscous resinous liquid to accelerate the foaming in the upper layers of the liquid which absorb most of the heat energy.

When the desired degree of foaming has taken place, the two facing sheets are confined between confining members, e. g. between the platens of a press spaced at an appropriate predetermined distance from one another, with the surfaces of the partially foamed resinous mixture facing, or in actual contact with, one another. The resinous mixture is then caused to foam further, e. g. at ambient temperature or by heating the platens of the press, so that the space between the facing sheets becomes filled completely with the foamed resin, the amount of resin used being more than that just necessary to fill the space so that the last stages of foaming occur under conditions of gradually increasing pressure. As a result of this operation, the two layers of foam become securely bonded to one another along their regions of least density, generally the region approximately midway between the facing sheets, and the regions adjacent the two facing sheets have a density upon completion of the foaming operation considerably greater than the region of least density. This may, in part, be due to the fact that the latter stages of foaming occur under pressure and the bubbles formed do not thus attain the same size as those first formed. In conventional practices of making foamed resinous masses where the foaming action is caused to proceed to completion under atmospheric or other substantially constant pressure, any inequality in density of the foam substantially disappears and the final result is a mass of foam of substantially average density throughout, even though the voids themselves may vary greatly in size from very small voids to large voids. Also, because of the pressure generated between the facing sheets, the latter are pressed into firm contact with the confining members and the panel as finally formed has a uniform thickness determined precisely by the distance separating the confining members.

The net result is a panel which, in addition to its highly uniform thickness, has a lightweight core which is of maximum density and strength in the regions adjacent the facing sheets and which decreases substantially regularly in density and strength in a direction away from each of the facing sheets until the region of least density and strength, approximately midway between the facing sheets, is reached. The core is thus strengthened, insofar as its failure under compression is concerned, in precisely those regions where it is subjected to the greatest compressive and tensile stresses and the ultimate strength of the panel at failure because of tensile stresses and of compressive stresses arising from the application of a lateral load are equalized more nearly than it is possible to do with a panel having a core of substantially uniform density throughout. At the same time the saving in weight and cost of core material over that needed to provide a panel of the same strength but with a core of uniform density is considerable. This added strength is obtained without increasing the weight or strength of either facing sheet, with the result that the tensile strength of the facing sheet and the compressive strength of the lightweight core are balanced more nearly equal to one another as far as failure of the panel under lateral load is concerned. The core and the facing sheets become bonded firmly to one another so that the necessity of employing a separate adhesive interposed between the core and a facing sheet to bond the two together is eliminated. Because of the increased strength and density of the regions of the core adjacent the facing sheets, the resistance of the panel to damage by impact is also increased enormously. The new panel is exceedingly stable, being moisture-proof, rot-proof and vermin-proof. It is strong, non-warping and non-corrosive and has high thermal, sound and electrical insulating values.

The process and product of the invention can be readily understood from the accompanying drawing wherein, in the interest of clarity, certain features are shown on a considerably exaggerated scale and wherein Figure 1 is an oblique view of a rectangular panel embodying features of the invention;

Figure 2 is a sectional elevation, greatly enlarged and distorted, of the panel of Figure 1;

Figure 3 is a sectional elevation corresponding roughly to Figure 2 but illustrating an alternate modification of a panel of the invention;

Figure 4 is a schematic representation, principally in section, of apparatus suitable for making one modification of a panel of the invention, and showing a pair of facing sheets and a quantity of a foam-forming hardenable resin in the apparatus prior to converting the resin to a hardened foam;

Figure 5 is a view corresponding to Figure 4 but after the foaming procedure has been carried out and showing clearly the formed panel still in the apparatus.

Figure 7 is a sectional elevation taken along the line VII—VII of Figure 6.

Figure 6:
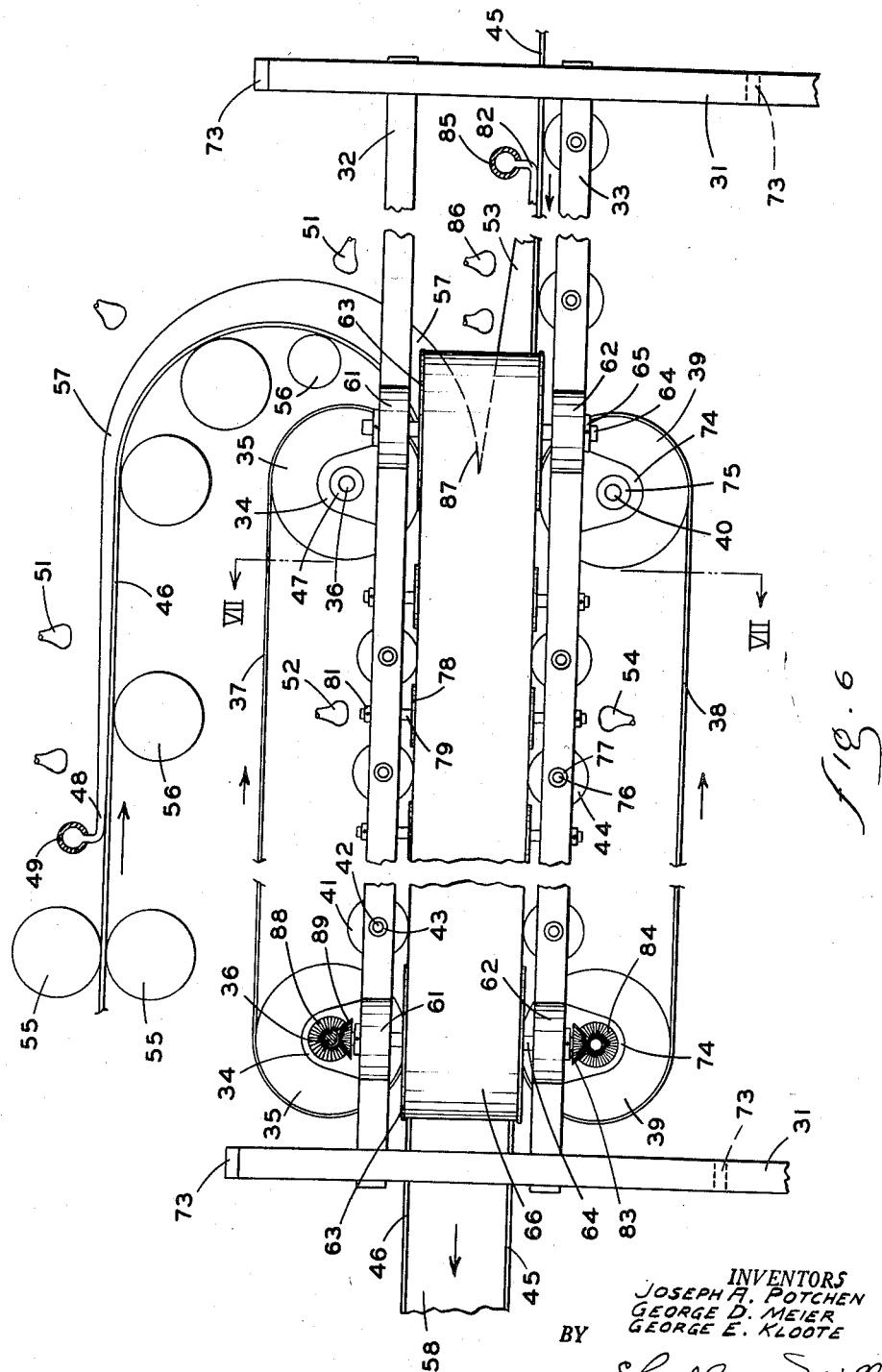
Figure 6 is a diagrammatic elevation of apparatus suitable for preparing continuously a panel of the invention similar to the modification of Figure 2.

The panel illustrated in Figure 1 comprises a pair of preformed facing sheets 11 bonded firmly to a lightweight core 12. As is shown in the enlarged section, Figure 2, the lightweight core comprises a foamed hardened resin in which the voids 13 in the section intermediate the facing sheets 11 are on the average larger and occupy a larger proportion of the space than do the voids 14 adjacent the facing sheets. The core thus increases in average density from its central region outward toward each facing sheet. The facing sheets 11 are preferably formed of a thermoset polyester resin reinforced with glass filaments 15, the filaments being woven into fabric when greatest tensile strength is desired. In the panels illustrated in the drawing, it will be noted that the region of bonding between the lightweight core and the facing sheet is devoid of a separate adhesive layer, the resin and facing sheet having been chosen so that during foaming and hardening the resin bonds directly to the facing sheet.

In Figures 4 and 5 there is illustrated schematically apparatus in which the preparation of a somewhat different modification of the invention can be carried out. According to this modification, a facing sheet 18 is placed on the lower platen 16 of a press and a spacing ring or stop 17, of convenient thickness and internal configuration, is placed on top of the facing sheet. A suitable quantity of a hardenable foam-forming resin 21 is then placed in the cavity formed by the ring 17 and the lower facing sheet 18. The inner surfaces of the facing ring are conveniently coated with a suitable mold release agent to keep the resin from sticking to it. A second facing sheet 19 is then laid across the top of the spacing ring 17 and the press is closed to bring the upper platen 20 into firm contact with the upper facing sheet 19. The platens may then be heated, if desirable or necessary, in any convenient manner, e. g. by circulating a heating fluid through ducts 22 in the platens or electrically, and the foaming and hardening of the resin 21 thus caused to proceed. Adequate provision is made for the escape of air from the space between the facing sheets 18 and 19 above the foam as the latter rises in the space between the facing sheets. This may be by way of small ducts or notches 23 in the top of the spacing ring 17 or by way of any other convenient or conventional arrangement.

As the foaming of the resinous layer 21 proceeds, the foam rises until it comes into contact with and adheres to the lower surface of the upper facing sheet 19. During this stage of the foaming action, the bubbles or voids 24 which are formed in the resinous mass are relatively large because the foaming occurs under constant atmospheric pressure. These bubbles, surrounded by walls of at least partially thickened and hardened resin, congregate to a considerable extent in the upper part of the layer of partially foamed resin, this being especially true of the larger bubbles. There is thus a considerable gradation in density of the resinous mass at this stage of the process from a relatively low density just beneath the upper facing sheet 19 to a relatively high density, approaching that of the liquid resin itself, just above the surface of the lower facing sheet 18.

As soon as the foam has filled the space between the facing sheets 18 and 19 completely, further foaming action increases the pressure throughout the resinous mass and the formation of bubbles or voids continues under an even increasing pressure with the result that the voids formed become smaller and smaller as time goes on. In addition, the resin becomes more and more viscous and there is less and less tendency for the bubbles to rise within the body of the resin both because of their smaller size and because of the increasing viscosity of the resin. The net result is a panel comprising the facing sheets 18 and 19 with the lightweight core 25 located between and adhered firmly to them and with the core characterized by a decreasing density from the region adjacent the lower facing sheet 18 to the region of lowest density adjacent the upper facing sheet 19.

After suitable hardening of the resinous mass has occurred, the mold is opened and the spacing ring 17, which is preferably composed of separably joined segments, removed. The projecting edges 26 of the facing sheets can then be trimmed off to leave a panel which is dimensionally stable and which, in this instance, is highly resistant to failure under lateral load when the load is applied on the facing sheet 18.

The process described as being carried out in the apparatus of Figures 4 and 5 can also be carried out omitting the use of the upper facing sheet 19 to produce an article consisting of a core faced only on the side of greatest density. In such instances it is usually advisable to coat the upper platen surface with a suitable mold release agent to prevent the foamed resin from sticking to it. When the process is carried out in this manner, a panel is obtained having the characteristics illustrated in the enlarged sectional view of Figure 3. The advantages of such a panel have been mentioned previously, wherein a single facing sheet 11, reinforced with a fabric 15 woven of strands of glass filaments, is bonded to a lightweight core 25 of a foamed resin in which the voids 14 adjacent the facing sheet are smaller and occupy less of the total space per unit volume than do the larger voids 13 adjacent the unfaced side of the core.

The apparatus illustrated in schematic elevation in Figures 6 and 7, which can be utilized to prepare a panel similar to that of Figure 2 in continuous fashion, comprises suitably spaced vertical supporting members 31, four of such members illustrated in the drawing being located as opposed pairs near either end of the apparatus. The two supporting members 31 at each end of the apparatus are tied together and braced in any convenient manner as by cross members 73 extending between and welded to them. A pair of upper bearing rails 32 and a pair of lower bearing rails 33 extend between the supports 31. Each of the upper bearing rails 32 is fitted with an upwardly projecting upper bearing support or lug 34, and with a laterally projecting side bearing support or lug 61 near each of its ends, and each of the lower bearing rails 33 is fitted with a downwardly projecting lower bearing support or lug 74, and with a laterally projecting side bearing support or lug 62 near each of its ends. The lugs 34 and 74 are arranged in opposite pairs as are also the lugs 61 and 62. In addition, the four pairs of lugs at one end of the apparatus, i. e. at the left hand end in Figure 6, are arranged, for reasons which will be apparent later, so that a shaft-receiving bearing can be located in each member of each pair with the centers of the eight bearings in the same vertical plane.

A transverse upper pulley 35 of convenient diameter is mounted on an axial shaft 36 which is journaled in an opposed pair of the upwardly projecting upper lugs 34, the shaft 36 being restrained from endwise motion by suitable collars 47. A second similar upper pulley 35 is mounted in entirely similar manner between the opposed upper lugs 34 at the opposite end of the upper bearing rails 32. A tightly tensioned upper belt, illustrated schematically at 37 and conveniently a series of rigid flat plates carried on chains similar to a conventional caterpillar tread, is carried by the pair of upper pulleys 35, the direction of travel of the belt 37 in the illustration given being such that its lower reach or flight moves from right to left.

In entirely analogous manner, a transverse lower pulley 39 is mounted on an axial shaft 40 which is journaled in an opposed pair of the lower lugs 74, the shaft being restrained against endwise motion by suitable collars 75. A second similar lower pulley 39 is mounted in entirely analogous fashion between the pair of opposed lugs 74 at the opposite end of the lower bearing rails 33. A tightly tensioned lower belt, illustrated schematically at 38 and similar to the belt 37, is carried by the pair of lower pulleys 39, the direction and speed of travel of its upper reach being the same as those of the lower reach of the upper belt 37. The upper pulleys 35 and the lower pulleys 39 are located so that the lower reach of the upper belt 37 and the upper reach of the lower belt 38 travel in parallel planes.

The lower reach of the upper belt 37 passes beneath and in contact with a series of transverse upper backing rolls 41, each on an axial shaft 42, the ends of which are journaled in the pair of upper bearing rails 32. Suitable collars 43 prevent end motion of the shafts 42. The backing rolls 41 are located so that their longitudinal axes are parallel with the longitudinal axes of the upper pulleys 35 and so that their lower edges are aligned with the lower edges of the upper pulleys 35 to prevent the lower reach of the belt 37 from bulging upwardly during its travel between the upper pulleys 35.

In similar manner, a series of transverse lower backing rolls 44 are mounted below the upper reach of the lower belt 38, each on an axial shaft 76 the ends of which are journaled in the pair of lower bearing rails 33. Suitable collars 77 prevent end motion of the shafts 76. The lower backing rolls 44 are located with their upper edges aligned with the upper edges of the lower pulleys 39 so that the upper reach of the belt 38 contacts them in its travel between the lower pulleys and is prevented from bulging or sagging downwardly.

From the foregoing it is seen that the lower reach of the upper belt 37 and the upper reach of the lower belt 38 define a space between them, herein for convenience referred to as a "curing zone," which is of uniform thickness throughout and that any material fed into the right hand end of the zone will be carried through and discharged from the left hand end of the zone and, furthermore, that if it has a tendency to expand or is maintained under pressure during its travel through the zone its thickness will be defined accurately by the spacing of the lower and upper reaches of the upper and lower belts 37 and 38, respectively.

In order to prevent material passing through the curing zone from escaping laterally from the zone, provision is also made for closing the sides of the zone with a pair of traveling side belts 66 similar to the upper and lower belts 37 and 38, the reaches of which lie in vertical planes. One reach of each of the side belts 66, referred to herein as its "inner" reach, abuts, and travels in the same direction and at the same speed as, one edge of both the lower reach of the upper belt 37 and the upper reach of the lower belt 38. In this way the inner reaches of the two side belts 66 effectively close the sides of the curing zone and prevent material from escaping from the zone as it passes through the zone. Each of the side belts 66 is carried by a pair of vertical pulleys 63, one of which is mounted near each end of the apparatus on a vertical shaft 64 journaled at its ends in an opposed pair of the lugs 61 and 62 described previously. Suitable collars 65 prevent endwise motion of the shafts 64.

The inner reach of each side belt 66 is held in firm contact with the edges of the lower reach of the upper belt 37 and with the upper reach of the lower belt 38, past both of which it generally projects vertically for a short distance, by a series of vertical backing rolls 78 each mounted on a vertical shaft 79 which is journaled at its ends in the upper and lower bearing rails 32 and 33. Suitable collars 81 prevent vertical movement of the shafts 79. The vertical backing rolls 78 are positioned with their inner edges aligned with the inner edges of the vertical pulleys 63 so that the inner reaches of the belts 66 are held firmly against the edges of the upper and lower belts 37 and 38 during their travel. The curing zone is thus defined in the form of an elongated rectangular space completely enclosed except at its ends.

The upper and lower belts 37 and 38 and the two side belts 66 can be driven in any suitable manner. In the illustration shown, especially by Figure 7, the shaft 36 on which one of the upper pulleys 35 is mounted is extended and connected to a conventional driving means, not shown. The shaft 36 is equipped, outside of and adjacent each of the lugs 35 in which it is journaled, with a bevel gear 88. One of the bevel gears 88 meshes with another bevel gear 89 mounted on the adjacent end of the shaft 64 upon which one of the vertical pulleys 63 is mounted. The other of the bevel gears 88 meshes with another bevel gear 89 on the adjacent end of the vertical shaft 64 opposite the first. The other end of one of the shafts 64 is equipped with still another bevel gear 83 which meshes with a bevel gear 84 on the shaft 40 on which the adjacent lower pulley 39 is mounted. Revolution of the shaft 36 by the driving means thus effectively rotates the upper pulley 35, the lower pulley 39 and the two adjacent side pulleys 63. The corresponding pulleys at the other end of the apparatus, as well as the vertical and transverse backing rolls, are idlers.

In operating the apparatus to produce the panel illustrated in Figure 2, a lower facing sheet 45, the same width as the upper reach of the lower belt 38, is fed into the curing zone from the right so that it lies flat on the upper reach of the lower belt 38. Prior to its entry into the curing zone, the upper surface of the lower facing sheet 45 is coated with a layer of the desired amount of a viscous liquid foam-forming hardenable resin or resinous mixture in any convenient way and using any convenient apparatus. In Figure 6 the foam-forming resin 82 is represented as being applied from a horizontal length of perforated or slit pipe 85 to which the resin is supplied from a supply source not shown.

After its deposition on the lower facing sheet 45, the liquid foam-forming resinous material is usually heated to accelerate the foam formation. This is accomplished in the illustration given by a series of radiant heaters 86 positioned at a suitable distance above the coating of resin so that the upper layers of the resin are heated more rapidly than are the lower layers adjacent the lower facing sheet 45. Foaming of the upper layers of the resin is thus accelerated faster than the foaming of the lower layers. The partially foamed resin 53 is then carried into the curing zone by the lower facing sheet 45 and will be referred to later.

An upper facing sheet 46, of the same width as the curing zone, is fed from a convenient source, not shown, into the same end of the curing zone as the lower facing sheet 45 and above the layer of partially foamed resin 53. Prior to its entry into the curing zone, the upper facing sheet 46 is coated on what will be its lower side in the zone with a suitable quantity of a viscous liquid foam-forming hardenable resin or resinous mixture 48, usually the same resinous mixture coated onto the lower facing sheet 45. This can be accomplished conveniently by traveling the upper facing sheet 46, which is generally sufficiently flexible to be bent in an arc of convenient radius, for a distance, prior to its entry into the curing zone, in a direction opposite to the direction of its travel in the zone. The liquid resin 48 can thus be applied to the upper surface of the traveling facing sheet, e. g. from a perforated or slit horizontal pipe 49 supplied from a convenient source or in any other convenient manner, and partially foamed and thickened prior to its entry into the curing zone.

In the illustration given in Figure 6, the upper facing sheet 46 is indicated as being drawn from a supply source, not shown, first between pinch rolls 55 and then over guide rolls 56, the rolls 55 and 56 shown schematically being mounted in any conventional and convenient manner but not generally driven, to insure its traveling smoothly in the desired path. The liquid resin can be applied either along the path of horizontal travel of the sheet 46, as illustrated, or along the curved portion of the path occasioned by the reversal of the direction of travel of the sheet. Generally speaking, the thinner the resinous mixture 48 at the time of its application the more desirable it is to apply it to the horizontally traveling sheet to prevent its flowing unduly on the sheet before thickening. When sufficiently viscous mixtures are used, the mixture can be applied nearer and nearer the point of entry of the facing sheet into the curing zone.

Following the application of the liquid resin 48 to the facing sheet 46, it is preferably heated on its upper surface, as by radiant heaters 51, so that the upper parts of the layer of resin are foamed more than the lower parts adjacent to the surface of the facing sheet 46 before the sheet enters the curing zone. Because of the initial high viscosity of the foam-forming resin 48 and the increase in its viscosity due to the hardening action which takes place during foaming, the partially foamed layer of resin 57 is carried by the upper facing sheet 46, as it reverses its direction of travel, into the curing zone with little or no tendency for the partially foamed resin to run or drip from the facing sheet 46. Furthermore, there is little tendency at this stage in the polymerization for the bubbles which have been formed to the greatest extent in the layers of the resin farthest removed from the facing sheet to redistribute themselves within the resinous mass as the mass is inverted prior to its entry into the curing zone. The condition of a gradation in density in the partially foamed resinous mass 57 from the region of greatest density adjacent the facing sheet 46 to the region of least density near the opposite surface of the partially foamed layer is thus preserved in the layer as it travels into and through the curing zone.

As noted previously, the four reaches of belts defining the curing zone travel at the same speed so that the upper and lower facing sheets 46 and 45 and the two masses of partially foamed resin 57 and 53 carried thereon enter and progress through the curing zone at the same speed. There is thus no shearing tendency exerted on any of the material entering the curing zone by reason of one part of it being moved through the zone faster than another part.

As the assembly of facing sheets and layers of partially foamed resin travels through the curing zone, the foaming of the two partially foamed resinous masses 57 and 53 is completed. The foaming of the upper mass 57 can be accelerated conveniently, if desired, by suitable heating means, such as radiant heaters 52, placed above and closely adjacent the lower reach of the upper belt 37 so that radiant heat is directed downward between the upper backing rolls 41 on to the lower reach of the upper belt 37. The latter is preferably metallic in character and heat is, therefore, transferred through it rapidly and serves to heat the partially foamed resinous material 57, it being noted that the heating is now effected through the upper facing sheet 46 so that the regions of the upper partially foamed resinous mass 57 adjacent the facing sheet are heated first and to the greatest extent. Similar radiant heating means 54 can be located immediately below the upper reach of the lower belt 38 and serve to heat the regions of the partially foamed resin 53 adjacent the lower facing sheet 45 to a greater extent than the regions farthest removed from the sheet 45. Generally speaking, the amount of heating required in the curing zone is minimal because of the generally exothermic nature of the hardening reaction. In many instances heating is unnecessary.

As the assembly progresses through the curing zone, foaming of the two resinous layers continues until such time as their surfaces meet and, because of their still incompletely polymerized nature, fuse together, e. g. along a region corresponding roughly to the region designated by the numeral 87, and become a continuous body of resin which is still incompletely foamed. As the process is generally carried out, the speed of the facing sheets 45 and 46 and the degree of foaming of the resin 82 and 48 effected prior to their entry into the curing zone are regulated so that the surfaces of the two partially foamed resinous masses 53 and 57 meet and fuse together either just as they enter the curing zone or very shortly thereafter. This is desirable in the interest of providing as short a curing zone as possible for the sake of economy and also to secure as great a thickening of the partially polymerized masses of resin, particularly of the upper mass 57, as possible to reduce to a minimum the disturbance of the relative density gradients within the resinous mass as it enters into and travels through the zone.

As the facing sheets 45 and 46 and resin move forward through the curing zone, the additional foaming of the now unitary mass of resin which occurs is effected under a continuously increasing pressure because of the fact that the space between the facing sheets is entirely filled. For this reason the foaming which takes place within the curing zone leads to the production of smaller and smaller bubbles, this foaming occurring to the greatest extent in the regions of the resinous mass adjacent the two facing sheets because of the greater concentration of unfoamed resin in these regions. The net result is that the panel leaving the curing zone, indicated at 58 in Figure 6, consists of a mass of foamed cured resin faced on each side with a facing sheet and having a density which is greatest near the two facing sheets and which decreases in a substantially regular manner to a region of lowest density located at approximately the center of the panel.

The travel of the panel and its constituent parts into and through the curing zone is effected principally by the traveling upper and lower belts, and to a lesser extent by the side belts. It has been noted that during the last stages of the polymerization, considerable pressure is generated by the foaming resin so that the facing sheets 45 and 46 are pressed firmly against the lower and upper belts 38 and 37. This pressure, which may be of the order of 5 to 10 pounds per square inch, or perhaps more, is sufficient, not only to insure a uniform, predetermined thickness of the panel, but also to cause the belts to draw the facing sheets from their sources of supply and to forward the entire structure through and out of the curing zone. The continuous length of panel is finally cut into desirable lengths by a flying saw or in any other convenient way.

Generally speaking, it is desirable, in carrying out the operation just described, to apply about the same amount of foam-forming resin per unit area to each of the facing sheets 45 and 46 and to then control the degree of foaming of the resin on each sheet to about the same degree prior to the entry of the sheets and partially foamed resinous masses into the curing zone. In this way the region of least density of the resinous core formed will lie approximately equidistant between the two facing sheets. Furthermore, it is possible to control the degree of foaming of one of the resinous masses 53 and 57 so that it is much more nearly completely foamed at the time it enters the curing zone than is the other mass. In this way not only is the region of least density of the core shifted toward one of the facing sheets but the density of the region of the core adjacent this same facing sheet is found to be greater than that of the region adjacent the other facing sheet. The degree of foaming of the resinous masses 53 and 57 prior to their entry into the curing zone can be controlled independently of one another, the degree of foaming of each being dependent upon the distance over which the mass travels while heated and of the intensity of heating.

Although not shown in the drawing, the apparatus of Figures 6 and 7 is generally constructed so that the distance between the lower reach of the upper belt and the upper reach of the lower belt can be adjusted for the preparation of panels of different thicknesses. This can be accomplished conveniently by providing for the adjustment upward or downward of the upper or lower belts together with the corresponding pulleys and backing rolls.

The preformed facing sheets utilized in making the multilaminar article of the invention are, as mentioned previously, formed of a polymerized polyester resinous sheet reinforced with glass fibers. The glass fibers employed can be unoriented, as in the form generally referred to as "mats," but for greatest tensile strength of the facing sheet and ease of handling during its production the glass filaments are preferably in one of the forms generally referred to as "woven fabric" or "woven roving" which are formed by weaving strands of glass filaments. The characteristics of such fabrics are well known in the art and need not be elaborated upon here. Fabrics are available such that a facing sheet prepared using a single ply of the fabric can have a thickness of from about 0.005, or thinner, to about 0.100 inch, or thicker. Thicker, and stronger, facing sheets can be prepared by using a plurality of plies of woven glass fabrics.

Facing sheets such as those just described can be formed according to known procedures. The formation of the facing sheets is sometimes accomplished by drawing a sheet of the fabric continuously through an impregnating bath of the partially polymerized resin containing a catalyst and copolymerizable agent, such as styrene, thence through a heated zone to polymerize and harden the polyester composition. The sheet is then cut into suitable lengths or, if not too thick, it can be rolled up on a fairly large radius. Sheets prepared in this manner have the advantage that the glass strands are maintained under stress in the direction of travel of the fabric and remain essentially straight in the finished sheet. The thickness of the sheet can be controlled to close tolerances by drawing it, prior to hardening the resin, between accurately spaced opposed rolls or doctor blades to remove the excess resin. Generally speaking, facing sheets prepared by this and similar procedures contain from 35 to 60 percent by weight, usually from about 40 to about 50 percent, of glass, the balance being resin.

The polyester resinous composition used in making the glass reinforced facing sheet can be any of the numerous commercially available polyester resins recommended for this purpose. As available and as generally employed, they are thick, viscous liquids capable of further polymerization and copolymerization under suitable conditions to effect cross-linking and form thermoset bodies. They are made by esterifying an olefinically unsaturated dicarboxylic acid, such as maleic acid, itaconic acid and citraconic acid, as well as mixtures thereof with one another or with a considerable proportion of a functionally saturated dicarboxylic acid, such as phthalic acid, tetrachlorophthalic acid, adipic acid and the like, with a polyhydric alcohol. Of special interest are the polyesters containing a considerable proportion of a halophthalic acid because of their substantially non-inflammable nature.

Polyhydric alcohols generally employed include ethylene glycol, propylene glycol, butylene glycol, polyethyene glycol, polypropylene glycol, monoesters and monoethers of glycerol and the like. Esterification is carried on until a predominately linear polymer of suitable viscosity and average molecular weight is obtained.

The predominately linear polyester thus obtained contains polymerizably reactive ethylenic unsaturation which, by copolymerization with a polymerizable olefinically reactive monomer, leads to the formation of cross-linked thermoset resins without the use of any appreciable pressure, if desired, and at ambient or conveniently low temperatures. Suitable olefinically reactive monomers include styrene, the halostyrenes, the methylstyrenes, isopropenyl toluene, vinyl naphthalene, acrylonitrile, methyl acrylate, and others. The cross-linking polymerization is usally carried out with the aid of a peroxide type catalyst.

In preparing the facing sheet using a woven glass fabric, the fabric is first impregnated thoroughly with a mixture of the polyester, peroxide catalyst and olefinically reactive monomer, e. g. 10 to 15 percent of monostyrene, being sure that each fiber is wetted thoroughly. Excess resin is then removed, if desirable or necessary, and the impregnated fabric heated to a polymerizing temperature, e. g. to 200° to 240° F. for a short time. The resulting facing sheet is characterized by a high degree of impermeability to moisture and vapor, by its high resistance to many and varied types of chemical reagents and by its high electrical insulating properties. The impregnating composition also frequently is made up containing conventional modifying agents, such as triethyl phosphate and other flexibilizers, plasticizers and viscosity reducing agents. Suitable pigments or soluble dyes can be included in the polyester composition prior to hardening, if desired.

The lightweight core of the multilaminar article of the invention which, as previously pointed out, is formed in situ is the reaction product of a polyisocyanate and a suitable polyester or alkyd resinous composition. The polyisocyanate used is preferably meta-toluene-diisocyanate because of its ready availability, but other aromatic polyisocyanates can be employed with entire satisfaction. These compounds, which are highly reactive, react with water or with organic hydroxyl and carboxyl groups, as is well known. The resinous polyester or alkyd mixture which is employed is chosen so that when it is mixed with a polyisocyanate the mixture contains sufficient water and carboxyl radicals, both of which lead to the formation of carbon dioxide upon reaction with a polyisocyanate, to give a foamed product of the desired density. Generally speaking, the polyester resins employed are viscous, predominately linear polymeric substances similar to those employed in making the facing sheet described previously and the alkyd resins are oil or acid modified polyester resins of similar types. The polyester resins can be made from saturated or unsaturated polybasic acids and polyhydric alcohols.

The resinous mixture which is mixed with the polyisocyanate to form the foamable composition preferably contains from about 0.2 to about 5 percent of water and may have a ratio of organic hydroxyl to organic carboxyl radicals between about 3 to 1 and 4 to 5. It has been found that such mixtures having an acid number of from about 5 to about 80 can be employed with satisfaction. It is pointed out, however, that resinous compositions having these properties are illustrative of preferred compositions but are not limiting, it being only necessary that the mixture employed can be foamed to give a core of the density desired.

Generally speaking, from about 35 to about 150 parts by weight, usually from about 25 to about 45 parts by weight, of the polyisocyanate is mixed with each 100 parts of resin. The water in the mixture can be that remaining from the esterification reaction or it can be added directly as water or in the form of an alcohol-soluble metallic salt hydrate, or in any other convenient and conventional manner. It is frequently desirable to include an emulsifying agent or a non-ionic wetting agent in the mixture to promote the dispersion of the water. Various modifying agents and foam stabilizers, such as metal soaps, leafing powders and quaternary ammonium bentonite complexes, can also be included, if desired. The various ingredients other than the polyisocyanates are generally mixed together first and the polyisocyanate then added and stirred thoroughly into the mixture just prior to the application of the mixture to the facing sheets. Foaming generally begins to take place almost immediately at ordinary temperatures and the entire mass will be converted to foam eventually even without heating. However, the foaming action is accelerated by heating as described with the resulting advantages pointed out. As a result of the reaction of the polyisocyanate with the reactive carboxyl radicals, the resins become highly cross-linked and the resultant foam is characterized by its relatively high heat stability. In addition, resinous mixtures can be employed to advantage in which additional cross-linking occurs by reactions not involving the polyisocyanate, such reactions and the reagents employed being conventional in the alkyd and polyesters, particularly when the essentially linear polyesters are unsaturated.

It will be apparent that by a proper selection of ingredients and the proportions thereof from which the foamed core is prepared, the density, toughness, brittleness, hardness and flexibility, as well as other properties, of the foamed core can be varied over relatively wide ranges to suit specific requirements and properties of the article prepared. Generally speaking, in the case of structural panels the core should be non-brittle, rigid but somewhat flexible and of as low density in the separate regions as is consistent with adequate strength and resistance to tensile, shearing and compressive stresses exerted in such regions under conditions of pure bending, concentrated loading and local loading or impact as are likely to be encountered in uses for which the panel is intended.

We claim:

1. A sandwich panel comprising a lightweight core and facing sheets integrally bonded to at least two sides of said core, said facing sheets comprising a thermoset polyester resinous composition and said core being a polyisocyanate foamed resinous composition, said core varying in density from the inner surface of each said facing sheet toward each other from a region of greater density immediately adjacent to the inner surface of each said sheet to a region of least density in an area spaced inwardly from each said sheet.

2. A sandwich panel in accordance with claim 1 wherein the region of least density is closer to one said facing sheet than to the other said facing sheet.

3. A sandwich panel comprising a lightweight core and facing sheets adhered to at least two sides of said core, said facing sheet comprising a thermoset polyester resinous composition reinforced with about 30% to 65% of the weight of the sheet of glass filaments and said core being a polyisocyanate foamed resinous composition, said core varying in density from the inner surface of each said facing sheet toward each other from a region of greater density immediately adjacent the said inner surface of each said sheet to a region of least density in an area spaced inwardly from each said sheet.

4. The method for forming a multilaminar panel, which includes: coating an otherwise uncoated surface of each of a pair of thermoset polyester resinous facing sheets reinforced with glass filaments with a layer of a viscous liquid foam-forming polyisocyanate-resin mixture; causing partial foaming of the polyisocyanate-resin mixture on each of the facing sheets to establish in each a density gradient from a region of greatest density adjacent the facing sheet to a region of least density spaced from said facing sheet, enclosing the facing sheets and partially foamed resinous layers, with the partially foamed layers facing one another, between confining surfaces insufficiently spaced to accommodate the two facing sheets and the foam-forming layers when the latter are fully foamed under constant pressure initially prevailing between the confining surfaces; causing the facing partially foamed layers to continue foaming until their surfaces meet and bond together to form a unitary partially hardened, partially foamed resinous mass having a density gradient from regions of highest density adjacent each of the facing sheets to a region of lowest density intermediate and removed from each said facing sheet, causing the partially foamed resinous mixture to continue foaming within the confined space until substantially fully foamed under conditions of continually increasing pressure generated by the continuous formation of gas within the body of the resin, whereby the density gradient within the resinous mass remains relatively undisturbed qualitatively and the mass is converted to a hardened lightweight core bonded firmly to each of the facing sheets, the multilaminar panel thus formed having a thickness determined by the distance separating opposite confining surfaces.

5. In a method for forming continuously a multilaminar panel, the steps which include: depositing a layer of a foam-forming polyisocyanate-resin mixture on an otherwise uncoated surface of each of a pair of thermoset polyester resinous facing sheets reinforced with about 30 to about 65 percent of the weight of the sheet of a fabric woven of strands of glass filaments, heating the surface of the foam-forming layer removed from the sheet to cause initial preferential foaming of the resin in and adjacent to the heated surface to thereby form on each facing sheet a partially foamed resinous layer and to establish within each of the layers a density gradient from a region of greatest density adjacent the facing sheet to a region of least density adjacent the heated surface moving the facing sheets and partially foamed resinous layers thereon with the layers facing one another continuously through a curing zone between confining surfaces insufficiently spaced to accommodate the two facing sheets and the two foam-forming layers when the latter are fully foamed under constant pressure initially prevailing between the confining surfaces, the initial preferential foaming being such that the two partially foamed layers meet adjacent the entrance into the curing zone and join to form a partially foamed resinous mass continuous between the facing sheets and having a density gradient from regions of greatest density adjacent each of the facing sheets to a region of least density intermediate and removed from the facing sheets; continuing heating of the partially foamed resinous mass as it progresses with the facing sheets through the curing zone between the space confining surfaces to cause substantially complete foaming of the partially foamed mixture under conditions of continuously increasing pressure generated by the continuous formation of bubbles of gas within the body of the resin which, because of the increasing pressure, become smaller and smaller whereby the density gradient within the foamed resinous mass remains relatively undisturbed; and removing continuously from the curing zone a multilaminar dimensionally stable panel of the same thickness as the distance separating the confining surfaces and comprising the two facing sheets bonded securely to a hardened lightweight foamed resinous core, the density of the core varying in substantially uniform manner from regions of highest density adjacent each of the facing sheets to a region of lowest density separated from and intermediate the facing sheets.

6. A method for forming a multilaminar panel which comprises the steps of coating a surface of each of a pair of facing sheets with a layer of a viscous liquid foam-forming polyisocyanate-resin mixture, partially foaming the said mixture on each of the said facing sheets to establish a partially foamed resinous layer thereon, said resinous layers each having a greater density in the region adjacent its facing sheet than in the region more remote from each said facing sheet, placing the said facing sheets between confining surfaces with the said partially foamed layers facing one another, effecting further foaming of the said partially foamed layers until the space between said confining surfaces is occupied by the expanding foam, and curing the said foam.

7. A method in accordance with claim 6 wherein the quantity of foam constituting the partially foamed resinous layer on one of said facing sheets is greater than the quantity of foam constituting the foam on the other of said facing sheets prior to the positioning of said foamed resinous layers in face to face relationship.

8. A method in accordance with claim 6 wherein said partial foaming is effected by impinging radiant heat directly on the surface of the foaming polyisocyanate resin mixture.

References Cited in the file of this patent

UNITED STATES PATENTS

| | | |
|---|---|---|
| 752,147 | Derick | Feb. 16, 1904 |
| 1,895,731 | Prenzl | Jan. 31, 1933 |
| 2,434,527 | Untiedt | Jan. 13, 1948 |
| 2,639,252 | Simon et al. | May 19, 1953 |
| 2,642,920 | Simon et al. | June 23, 1953 |
| 2,690,987 | Jeffries et al. | Oct. 5, 1954 |
| 2,744,042 | Pace | May 1, 1956 |
| 2,753,642 | Sullivan | July 10, 1956 |

FOREIGN PATENTS

| | | |
|---|---|---|
| 842,267 | Germany | Sept. 15, 1952 |